United States Patent [19]
Baumoel et al.

[11] Patent Number: 6,026,693
[45] Date of Patent: *Feb. 22, 2000

[54] PIPE SPOOL SECTION HAVING SQUARE OR RECTANGULAR CROSS-SECTION FOR CLAMP ON TRANSDUCER AND METHOD FOR FLOW MEASUREMENT

[76] Inventors: Douglas S. Baumoel; Joseph Baumoel, both of 155 Plant Ave., Hauppauge, N.Y. 11788

[ * ] Notice: This patent issued on a continued prosecution application filed under 37 CFR 1.53(d), and is subject to the twenty year patent term provisions of 35 U.S.C. 154(a)(2).

[21] Appl. No.: 08/868,755

[22] Filed: Jun. 4, 1997

[51] Int. Cl.⁷ .................................................... G01F 1/66
[52] U.S. Cl. ........................................................ 73/861.27
[58] Field of Search ......................... 73/861.27, 861.28, 73/861.29, 861.31

[56] References Cited

U.S. PATENT DOCUMENTS

| | | |
|---|---|---|
| 2,746,291 | 5/1956 | Swengel .............................. 73/861.31 |
| 3,987,674 | 10/1976 | Baumoel ................................. 73/194 |
| 4,028,938 | 6/1977 | Eck ...................................... 73/861.31 |
| 4,109,523 | 8/1978 | Teyssandier ......................... 73/861.31 |
| 4,365,518 | 12/1982 | Zacharias, Jr. ....................... 73/861.31 |
| 4,646,575 | 3/1987 | O'Hair et al. ....................... 73/861.31 |
| 5,090,252 | 2/1992 | Tschirner ............................. 73/861.28 |

*Primary Examiner*—Benjamin R. Fuller
*Assistant Examiner*—Jewel V. Thompson
*Attorney, Agent, or Firm*—Ostrolenk, Faber, Gerb & Soffen, LLP

[57] ABSTRACT

Apparatus for insertion into a pipe adapted for mounting an ultrasonic flow measurement transducer, the apparatus comprising, in a preferred embodiment two flanges adapted to connect into a pipe, a center section connected between the two flanges, the two flanges having central openings therein for fluid flowing through the pipe, the center section being hollow for the flow of fluid from the pipe therethrough and communicating with the pipe through the openings in the flanges, the center section having a substantially square or rectangular cross-section, the center section having an outer substantially flat surface adapted for mounting of at least one pair of ultrasonic transmitting and receiving flow measurement transducers thereon.

73 Claims, 13 Drawing Sheets

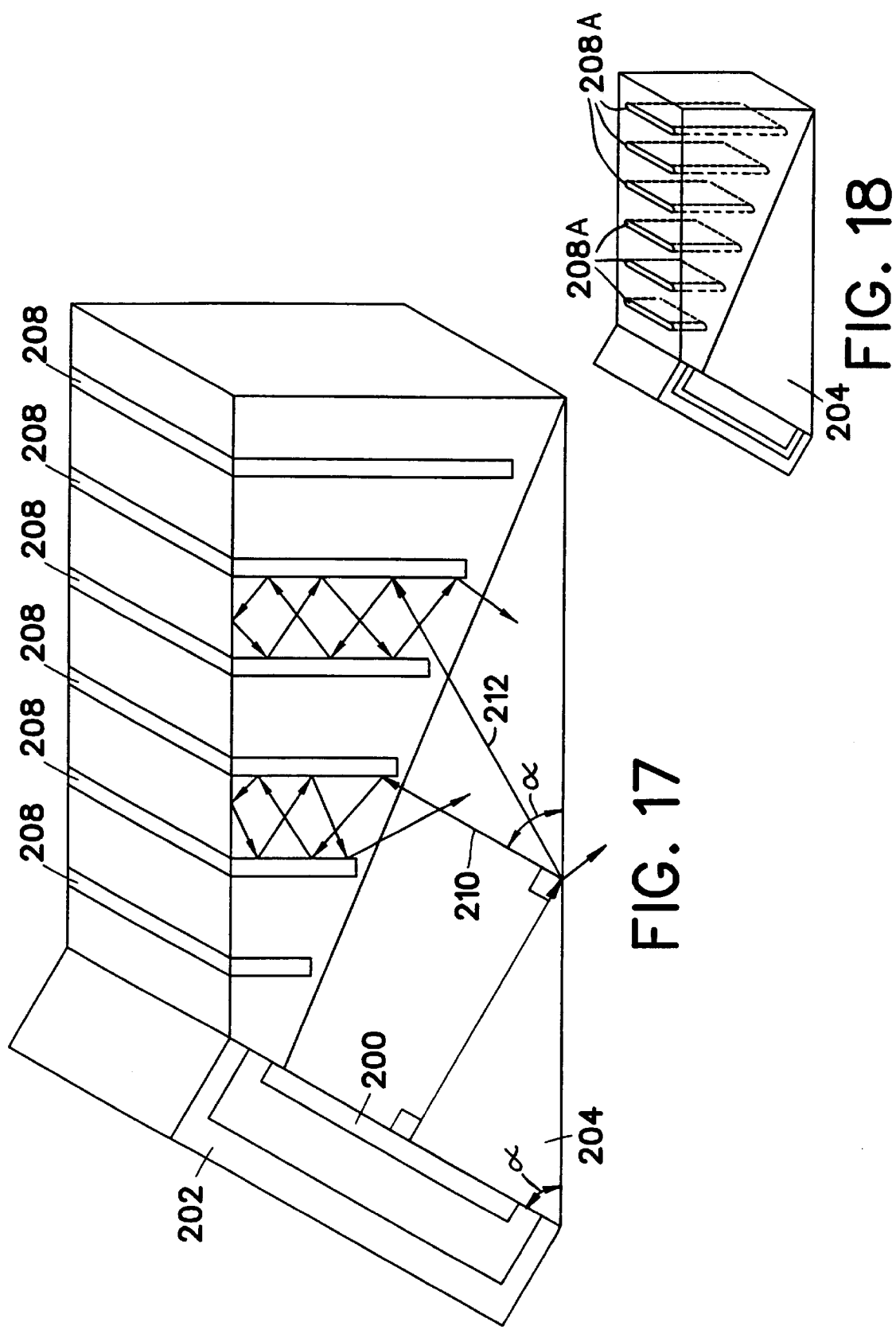

6,026,693

PIPE SPOOL SECTION HAVING SQUARE OR RECTANGULAR CROSS-SECTION FOR CLAMP ON TRANSDUCER AND METHOD FOR FLOW MEASUREMENT

BACKGROUND OF THE INVENTION

The present invention relates to flow measurement devices and methods, and in particular to flow measurement devices and methods using ultrasonic energy to determine flow rate.

Flow meters using ultrasonic transducers, particularly non-intrusive transducers of the clamp-on variety, are known. For example, ControLotron Corporation of Hauppauge, N.Y. produces flow meters which have transducers that clamp-on to pipes of pipelines for non-intrusively determining the flow rate within the pipeline. According to these types of flow meters, ultrasonic transducers are clamped onto the pipe wall, and an ultrasonic signal is transmitted into the pipeline wall and emerges into the fluid and flows through the fluid traversing in the pipeline. The difference between the upstream and downstream transit times of sonic energy transmitted diagonally through the fluid in the pipeline is then used to determine the flow velocity according to well-known principles. See, for example, U.S. Pat. Nos. 4,232,548 and 5,453,944. In particular, the flow velocity is determined by the following formula: $VF = K\Delta t/TL$ where VF equals the flow velocity, K equals a dimensioned calibration factor in units of volume/time, $\Delta t$ equals the measured upstream minus downstream transit-time difference and TL is the measured average upstream and downstream transit time.

Such transducers may be of the wide beam path type as disclosed in U.S. Pat. No. 3,987,674. Wide beam transducers are matched to the resonant frequency and phase velocity of the pipe by suitable selection of the angle at which the transducer is mounted with respect to the axis of the pipe and selection of the material of the transducer body. Basically, it is necessary to choose the angle and a material for the transducer body which has a longitudinal mode sonic velocity that is less than the shear mode velocity of the pipe or conduit material. This is necessary so that the phase velocity of the sonic energy in the transducer housing can be adjusted to match the shear mode velocity of the pipe.

As well known in the art, the transducers may be arranged on opposite portions of the pipeline wall or they may be arranged on the same side of the pipeline by utilizing the reflection from the opposite wall portion.

Also known is that when fluid flows through a pipe, the Reynolds number $N_R$ affects the profile of the fluid through the pipe. By profile is meant the profile of the velocity vector across the cross sectional area of the pipe. It is known that in steady state conditions, the velocity at the center is generally higher than the velocity near the walls of the pipe. Also known is that the higher the Reynolds number, the flatter the flow profile. Such factors as the diameter of the pipe, the viscosity and flow rate all factor into the determination of the Reynolds number $N_R$.

The Reynolds number also determines the transition from what is known as laminar to turbulent flow. Typically, the transition occurs for Reynolds numbers between 2000 and 4000.

A problem with the steady state flow profile is that the determination of the flow volumetric rate is not independent of the Reynolds number. Unless Gaussian quadrature chordal summation techniques, known to those of skill in the art, are utilized, it is difficult to obtain the correct flow rate because the flow rate is dependent on the Reynolds number. In order to determine the flow rate accurately, it is useful to apply the Gaussian quadrature chordal summation technique because this technique makes determination of flow rate relatively independent of Reynolds number.

The Gaussian quadrature chordal summation technique is typically used to determine flow rate when the fluid flow exhibits a non-flat flow profile. When there is a non-flat flow profile this technique can be used to determine the true flow rate based on the outputs from ultrasonic flow measurement transducers. It is not needed when the flow profile is flat. In order to determine the flow rate accurately, it is preferred that the entire flow within the pipe should be illuminated by the ultrasonic energy. If more than one transducer is used to illuminate the flow, the results from the plurality of transducers must be appropriately summed. Assuming that the ultrasonic transducers utilized to determine the flow rate fully illuminate the flow profile within the pipe, it is possible using Gaussian quadrature chordal summation techniques to determine the correct flow rate when there is a non-flat profile. This summation technique is required because to establish chordal illumination in a round pipe requires inserting transducers into the flow stream, resulting in unequal chord lengths and unequal sensed volumes. If the flow profile is almost flat, the Gaussian quadrature chordal summation is less necessary, but if applied, will compensate for the shape of the profile. Alternatively, flow rate can be obtained by simple averaging over a number of parallel paths illuminated by the transducers, but this is possible only for paths of equal length and volume.

The use of the Gaussian quadrature chordal summation technique is somewhat complex requiring individual processing of each path's data and it would be advantageous to be able to determine flow rate accurately without resorting to this technique.

Another problem in prior art ultrasonic flow meters is that unwanted pipe "noise" signals are received at the receive transducer which have not traversed the liquid in the pipe but instead have travelled through the pipe wall to the receive transducer. Although some of these unwanted pipe noise signals can be eliminated, if they arrive at a different time from the liquid signal or are asynchronous, some can not because they may occur about the same time as the receive signal through the liquid in the pipe, thus leading to corruption of the desired receive signal and possibly incorrect timing determination and consequently incorrect flow rate.

SUMMARY OF THE INVENTION

The present invention is directed to a technique and apparatus for allowing clamp-on ultrasonic transducers to accurately determine the volumetric flow rate in a pipe.

Furthermore, the invention is directed to a technique and apparatus allowing determination of flow rate independent of the Reynolds number and without necessarily resorting to Gaussian quadrature chordal summation.

The present invention provides a spool section for insertion into a pipe which sufficiently flattens the flow profile of the fluid within the pipe so that ultrasonic transducers can accurately measure the flow rate without necessarily requiring Gaussian quadrature chordal summation or other flow profile compensation techniques.

The present invention furthermore provides an apparatus and technique whereby ultrasonic clamp-on transducers can fully illuminate the flow area and further, provides a device and technique whereby clamp-on transducers can alternatively be provided on the pipe to produce a number of parallel beams of ultrasonic energy to illuminate the flow within the pipe in such a way as to permit parallel summation in place of Gaussian chordal summation of individual paths.

The invention also allows for elimination of unwanted noise signals which would ordinarily travel through the pipe wall and which could corrupt the desired receive signal travelling through the fluid in the pipe.

The invention also allows for accurate calibration of flow meters in pipelines as well as eases the ability, through correlation techniques, to determine flow rate.

According to one aspect, the invention comprises apparatus for insertion into a pipe adapted for mounting an ultrasonic flow measurement transducer, the apparatus comprising: two connectors adapted to connect into a pipe; a center section coupled between the two connectors, the two connectors having central openings therein for fluid flowing through the pipe, the center section being hollow for the flow of fluid from the pipe therethrough and communicating with the pipe through the openings in the connectors, the center section having a transverse cross-section having at least two substantially flat opposed portions; the center section having an outer substantially flat surface adapted for mounting of at least one pair of ultrasonic transmitting and receiving flow measurement transducers thereon.

Preferably the center section has a substantially square or rectangular transverse cross-section, although it is only necessary that two opposed portions be substantially flat where sonic energy impinges on the portions.

According to another aspect, the invention comprises a method for determining the volumetric flow rate of fluid within a pipe comprising the steps of coupling a member into the pipe having a hollow section for the flow of fluid from the pipe therethrough and communicating with the pipe, the hollow section having a transverse cross section having at least two substantially flat opposed portions, mounting at least one pair of ultrasonic transmitting and receiving flow measurement transducers on an outer substantially flat surface of said hollow section, illuminating the fluid flowing in the hollow section with sonic energy from said pair of transmitting and receiving transducers, and calculating the volumetric flow rate based on data from polling said at least one pair of transmitting and receiving transducers.

According to yet still another aspect, the invention comprises a method for flattening the flow profile of fluid flowing within a pipe comprising the steps of coupling a member into the pipe having a hollow section for the flow of fluid from the pipe therethrough and communicating with the pipe, the hollow section having a cross-section having at least two substantially flat opposed portions.

According to yet still a further aspect, the invention comprises a method for minimizing unwanted sonic signals traveling through a pipe wall in an ultrasonic flow measurement device comprising the steps of coupling a member into the pipe having a hollow section for the flow of fluid from the pipe therethrough and communicating with the pipe, the hollow section having a cross-section having substantially square corners.

Also described is a method and apparatus for attenuating unwanted noise signals travelling in the pipe walls and a method for calibrating flow measurement systems.

Other features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which:

FIG. 17 is a simplified perspective view of an embodiment of a transducer according to FIG. 16; and FIG. 18 shows an alternative embodiment of the transducer structure.

DETAILED DESCRIPTION OF EMBODIMENTS OF THE INVENTION

Figure 1:
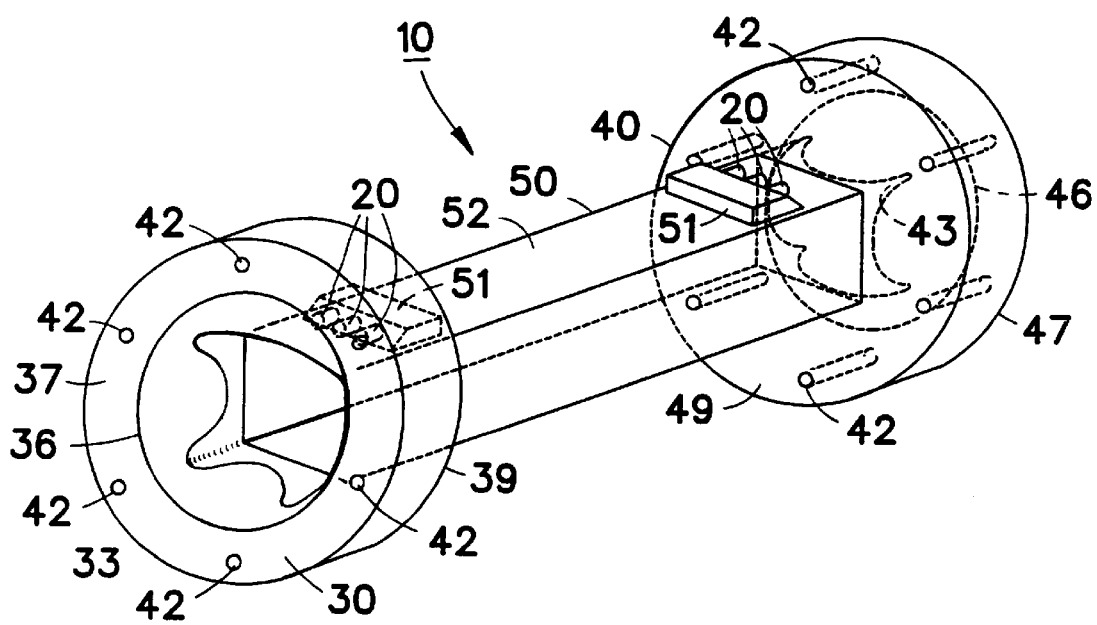
FIG. 1 is a perspective view of an embodiment of the device according to the invention for insertion into a pipeline.

With reference now to the drawings, FIG. 1 is a perspective view of a preferred embodiment of the device according to the present invention. The device according to the present invention comprises a "spool" section 10 for insertion within a pipe and which can serve for the mounting of ultrasonic transducers of the clamp-on variety, shown schematically by reference numerals 20, and particularly wide beam transducers of the type described in U.S. Pat. No. 3,987,674. The spool section includes first and second connectors, e.g., flanges 30 and 40, for attachment into the pipe, each having fastening members, in the case shown, bolt holes 42, for coupling the flanges into the pipeline. The flanges 30 and 40 include respective apertures 36 and 46 for the passage therethrough of the fluid in the pipe. These apertures preferably are sized at the external flange surfaces 37, 47 to be the same size as the diameter of the pipe in which the spool section 10 is inserted.

Alternatively, instead of bolt-in flanges 30 and 40, the spool section 10 of the invention can be welded into a pipeline and have suitable weldment connectors.

The two flanges or weldment connectors 30 and 40 are connected together by a member 50 preferably having a square or rectangular cross-section. Preferably the cross section is gently rounded at the corners. Alternatively the member 50 can have a cross section other than a square or rectangle, so long as opposed portions, in the line of ultrasonic signals from the transducers, are substantially flat. For example, a trapezoidal or polygonal cross section would be acceptable. See FIGS. 9A to 9D for examples of suitable cross sections.

Figure 2:
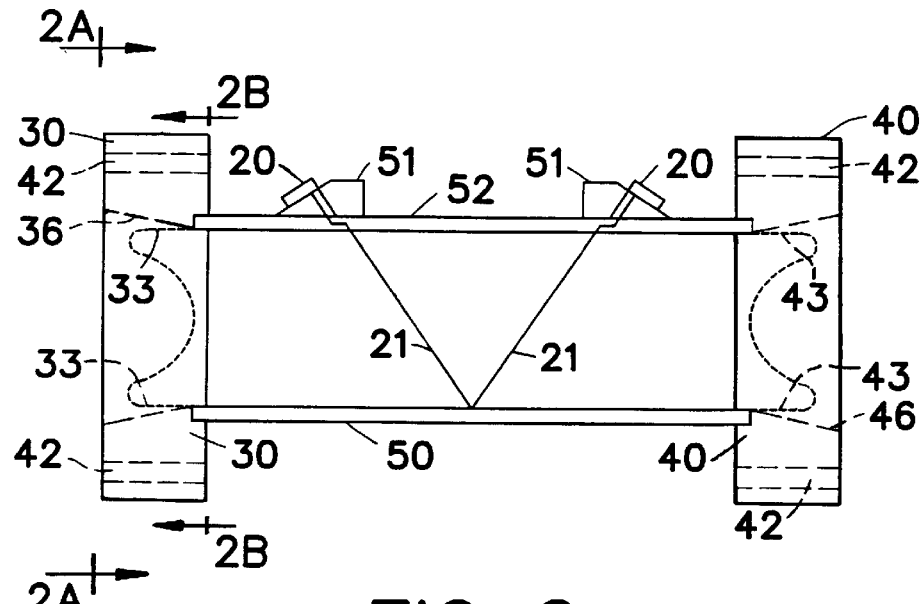
FIG. 2 is a side view of the device of FIG. 1 partly in longitudinal cross-section.
Figure 2A:
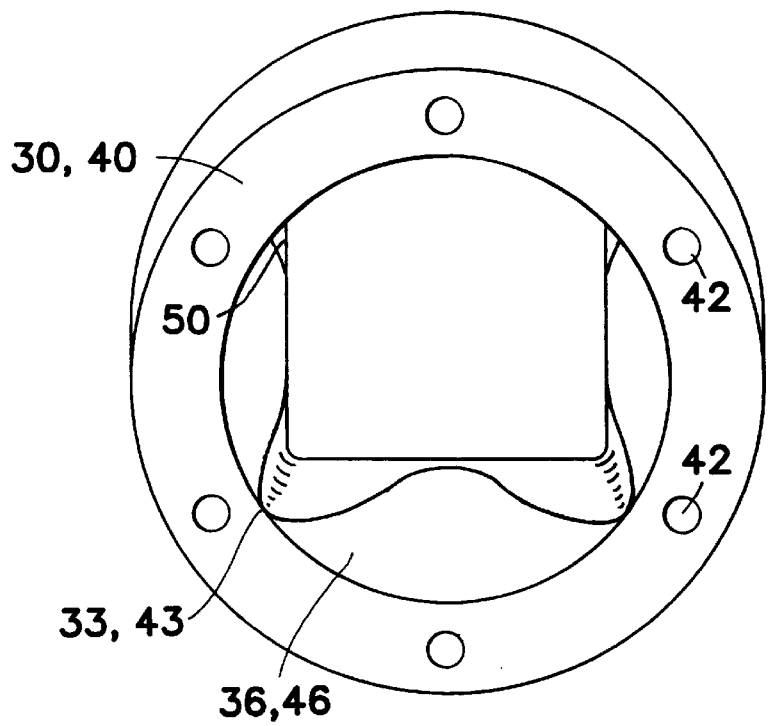
FIG. 2A is an end perspective view along lines 2A—2A of FIG. 2.

At the inside surface 39, 49 of each connector 30, 40 coupled to member 50, the aperture 36, 46 has the shape (e.g. square or rectangular) of member 50 which has a lower net area than the pipeline, nominally in a ratio of the area of a square inscribed in a circle to the area of the circle. See FIG. 2C.

The flanges 30, 40 preferably are provided with a recess 31, 41 on the side 39, 49 having the cross-section of member 50 so that member 50 is received within the recess. Member 50 is then preferably welded to members 30, 40.

Figure 2B:
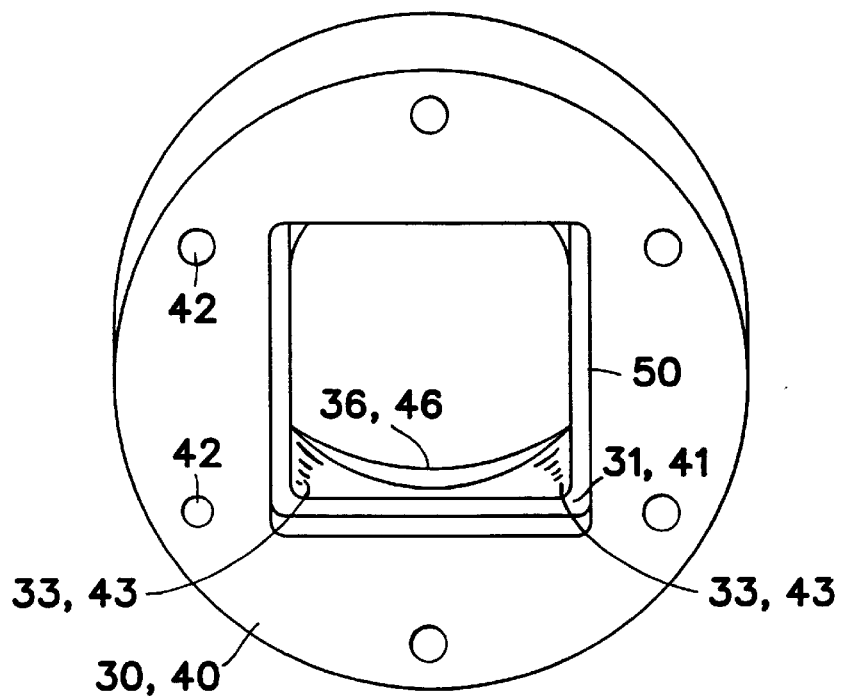
FIG. 2B is a perspective view along lines 2B—2B of FIG. 2.
Figure 2C:
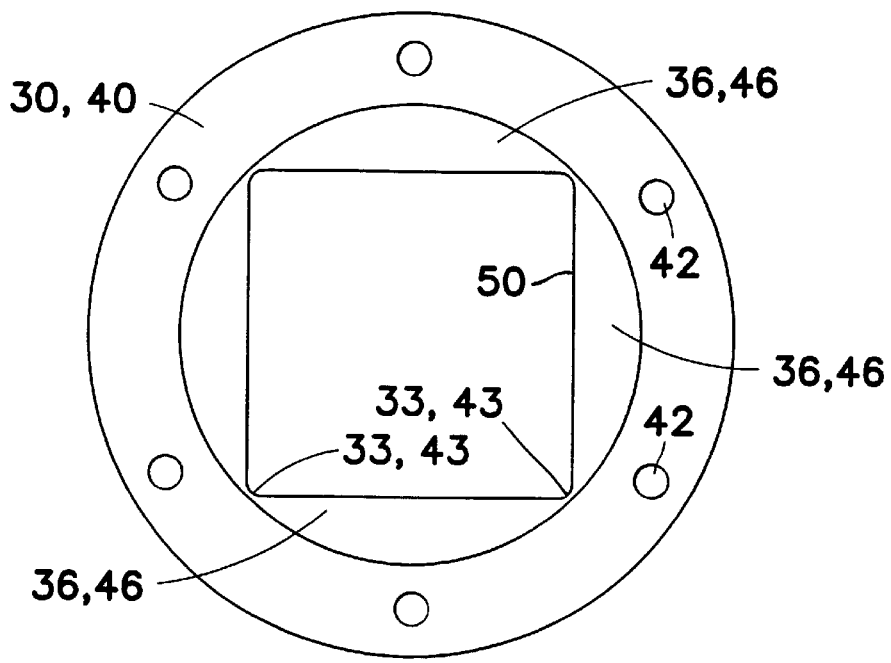
FIG. 2C is an end plan view along lines 2A—2A of FIG. 2.
Figure 2D:
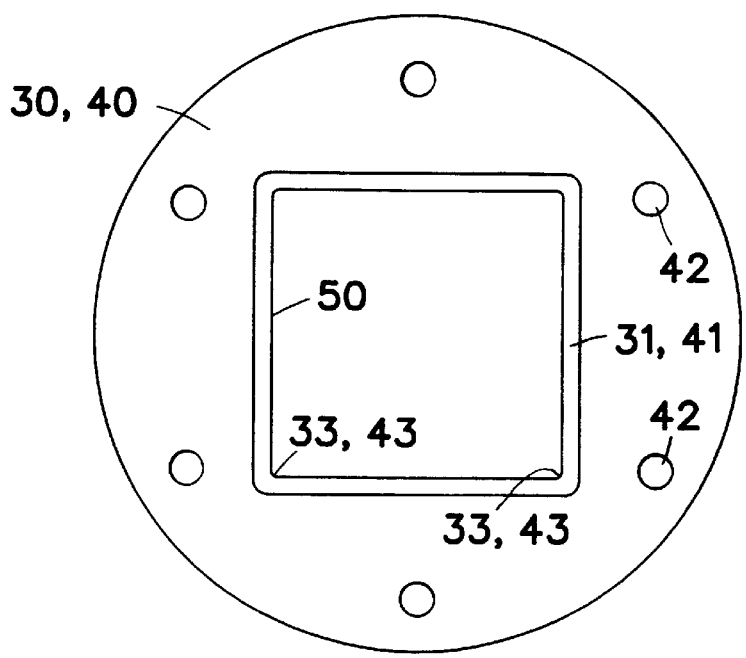
FIG. 2D is a plan view along lines 2B—2B of FIG. 2.

Apertures 36, 46 preferably have a quasi-frusto-conical shape (FIG. 2A), tapering into the square or rectangular opening of the cross-section of member 50 (FIG. 2B). Therefore, by connecting the spool section into a pipeline, the fluid travels from the pipeline having a substantially circular cross-section into the member 50 having a preferably rectangular or square cross-section. As will be explained below, the transition from round cross-section to rectangular or square cross-section of lower net area of member 50 causes a flattening of the flow profile. In addition, a swirl generating device can be provided to assist in flow profile flattening, as described below.

As shown in FIGS. 1–3 and 2A–2E, the openings 36, 46 in connectors 30, 40 are at least partly conically shaped, transitioning from the round cross-section of the pipe to the preferably square or rectangular cross-section of lower net area of the member 50. This transition region also assists in minimizing the fluid pressure drop. Essentially, in the embodiment shown, the fluid flowing in one connector 30, 40 transitions from a conically shaped opening into a square or rectangular opening centered on the axis of the cone, and vice versa for the opposite connector.

Figure 3:
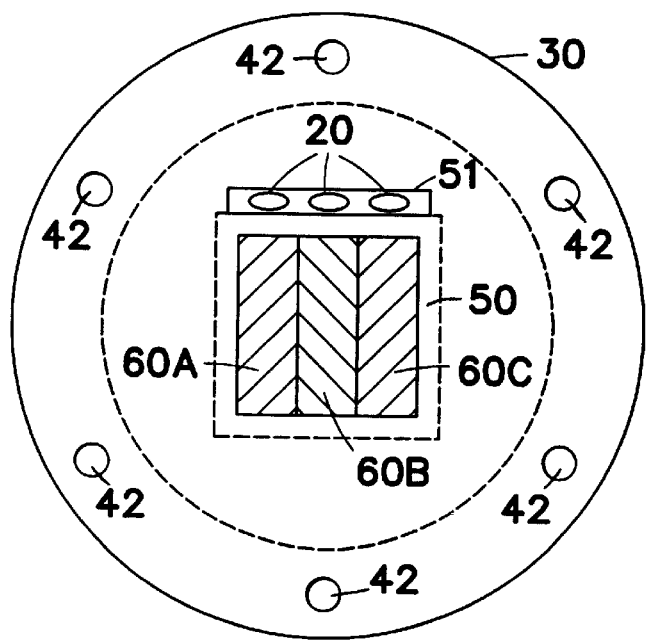
FIG. 3 is an end view of the device of FIG. 2 useful in explaining operation of the device.

As shown in FIGS. 1 and 2, the ultrasonic transducer crystals 20 may be mounted on a transducer block 51 mounted to a flat surface 52 of the section 50. This conveniently allows, as shown in FIG. 3, substantially full illumination by sonic energy across the entire flow within the member 50. As shown in FIGS. 1–3, three ultrasonic transducer crystal pairs have illustratively been attached which provide three equal parallel beams 60A, 60B and 60C for substantially fully illuminating the flow within the section 50 with beams of substantially equal fluid volumes. Alternatively, one continuous transducer crystal can be used. The three parallel beams 60A, 60B and 60C are shown by the alternate diagonally shaded areas of FIG. 3. Although three transducer crystal pairs have been shown, one or a different number of a plurality of transducer pairs can be used.

If the entire flow profile is substantially illuminated by sonic energy, and the illuminated volumes are equal, then the independent flow measurements from the individual transducer pairs can be summed to determine the flow velocity. Alternatively, if one single crystal is used, the resultant average receive signal is used. Compensation techniques may then be necessary to compensate for the flow profile.

In contrast, with a round pipe cross section, it is difficult to obtain beams illuminating equal volumes. Simple summing of the flow measurements from the individual transducers cannot be performed and it is necessary to resort to the more complex Gaussian quadrature summation technique.

As shown in FIG. 2, each of the transducers 20 of a transducer pair illuminates a portion of the flow in a generally diagonal line 21, thereby to provide a reflection to the other of the transducers of the pair for determination of transit time. As known to those of skill in the art, the receiving transducer can also be mounted on the opposite side wall, when not making use of reflection from the opposite side wall. The transducers should be of the wide beam type, as described in applicant's U.S. Pat. No. 3,987,674.

Figure 5:
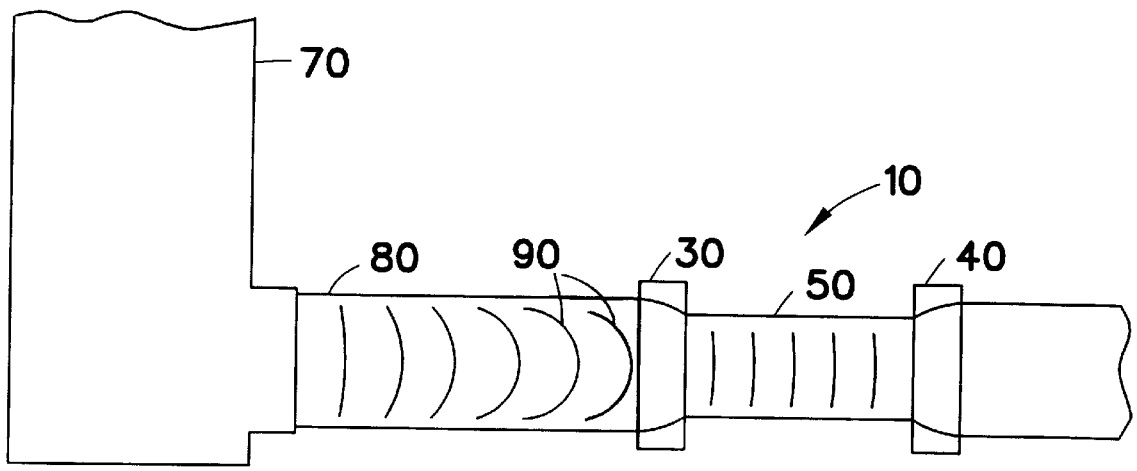
FIG. 5 is a schematic representation showing how the device according to the present invention operates by flattening the flow profile.

As shown in FIG. 5, the spool section 10 according to the present invention flattens the velocity or flow profile, thereby enabling accurate determination of volumetric flow rate without necessarily requiring Gaussian quadrature chordal summation. As illustrated, with a typical circular cross-sectional pipe, fluid from the reservoir 70 will enter the pipe 80, eventually developing a flow profile shown by the curved lines 90. This is a well known principle and is caused by factors known to those of skill in the art, including for example, frictional forces due to the pipe walls. In essence, the flow profile is such that the velocity at the center of the pipe is greater than the velocity near the pipe walls.

This flow profile causes problems in determining the true volumetric flow rate. If full illumination of the pipeline, i.e., enough transducers are provided such that the flow is completely illuminated by ultrasonic energy, and assuming a non-flat flow profile, and if the chords are not of equal length and volume—assuming a round pipe, it is possible to obtain an accurate measurement of the flow rate using Gaussian quadrature chordal summation. Typically, the flow profile is not flat. It is only when the flow profile is flat or nearly flat that Gaussian quadrature chordal summation is not necessary. The Gaussian quadrature chordal summation technique is well known to those of skill in the art. The present invention provides a means for minimizing or eliminating the need to apply the Gaussian quadrature chordal summation technique even for non-flat flow profiles.

Without actually penetrating the pipe, it is difficult to employ ultrasonic clamp-on transducers on a circular cross section pipe in order to fully illuminate the flow in the pipe because it is difficult to provide fully parallel ultrasonic paths of energy due to the circular cross-section of the pipe. It is necessary to fully illuminate the pipe with parallel paths of sonic energy in order to accurately determine flow rate.

The present invention provides a simple means for accurately determining volumetric flow rate. The present invention provides a convenient means to locate sonic transducers for full or partial (chordal) illumination of the pipe flow. For example, as shown in the drawing figures, three transducer pairs are illustratively used to fully illuminate the pipe flow. The mounting is simple because the member 50 has flat surfaces, e.g. the surface 52. The flat surface 52 of the section 50 allows the transducers 20 to be mounted so as to fully illuminate the flow cross-section with parallel beam paths. Furthermore, the transition from round cross-section to preferably square or rectangular cross-section significantly flattens the flow profile, as shown in FIG. 5. As a result, because the flow profile is substantially flat, it is not generally necessary to apply Gaussian quadrature chordal summation techniques to use the signals from the plurality of ultrasonic transducers that together fully illuminate the cross-section of the pipeline to determine the correct volumetric flow rate. Because the flow profile is substantially flat, it is also not necessary to apply non-linear flow profile compensation techniques, as in normal round pipes.

Figure 6:
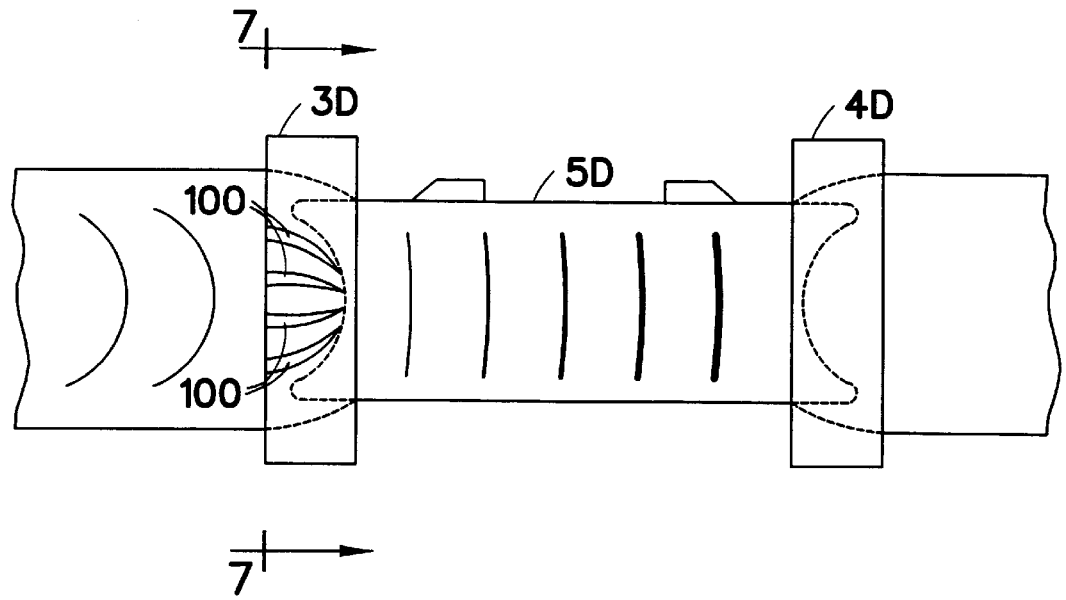
FIG. 6 is a side view of the device according to the present invention showing structure within the device for helping to ensure that the flow profile within the device is substantially flat.
Figure 7:
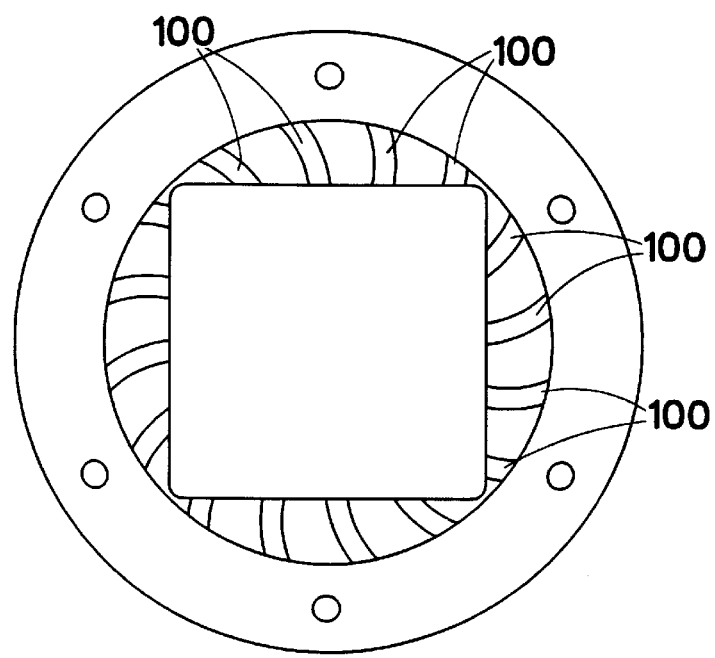
FIG. 7 is a cross-sectional view along the lines 7—7 of FIG. 6 showing the added flow profile straightening structure for causing fluid swirl by adding momentum mixing.

Although the present invention significantly flattens the flow profile, as shown schematically in FIG. 5, it is also possible to add additional flow profile flattening devices, for example, arcuate flutes or grooves 100 as shown in FIG. 6, and shown in plan view in FIG. 7, which aid in flattening the flow profile by generating swirl in the fluid flow. These flow profile flattening devices ensure that the flow profile within the spool section is more substantially flat. The conical to square or rectangular transition of the connectors 30, 40 themselves contribute to swirl generation, thus causing the flattening of the flow profile to increase. In particular, the gently rounded square corners 33, 43 of the transitioning flanges 30, 40 produced at the intersection of the square or rectangular cross section with the cone generate swirl themselves as the fluid is channelled by the conical surfaces into the corners 33, 43 and mix the momentum of the entering fluid to produce a flat profile.

Accordingly, the invention provides a way to flatten the flow profile. This makes the determination of flow rate possible without using Gaussian quadrature chordal summation and flow profile compensation techniques. In addition, the flat surfaces of the rectangular or square cross-section member 50 provide a convenient means for disposing ultrasonic clamp-on transducers which allows full illumination of the flow profile within the spool section with parallel path sonic beams, enabling accurate determination of flow rate.

Furthermore, the invention provides a convenient means for clamping on ultrasonic transducers due to the flat external surfaces of the member 50.

As stated, because the flow profile within the spool section 10 of the invention is substantially flat, the need to apply Gaussian quadrature chordal summation is minimized or eliminated and the need for flow profile compensation techniques is minimized. To ensure that the flow profile is substantially flat, additional flow profile flattening structures, as shown in FIGS. 6 and 7, can be employed, thus ensuring that the flow profile is substantially flat and allowing accurate determination of flow rate without generally requiring Gaussian quadrature chordal summation.

In use, at least one transducer pair is disposed on the surface 52 of the spool section 10 of the invention to fully illuminate the flow within the section 10. Each of the ultrasonic transducers is polled, as known in the art, to determine the upstream/downstream transit time difference and the average transit time for determining the flow rate. Each of the transducer outputs can be measured independently by a multichannel flow meter, as known to those of skill in the art. Alternatively, single channel flow meters can be used and the multiple transducers polled simultaneously. Simple parallel transducer summation is then used to determine, with accuracy, the total flow rate.

The Gaussian quadrature chordal summation, well known to those of skill in the art, is not necessary to determine the volumetric flow rate because of the substantially flat flow profile of the fluid flow within section 50. Because of the substantially flat flow profile of the fluid within the spool section of the invention, flow compensation techniques are also not necessary. They can be used, however, if the flow profile is somewhat unflat.

Figure 8:
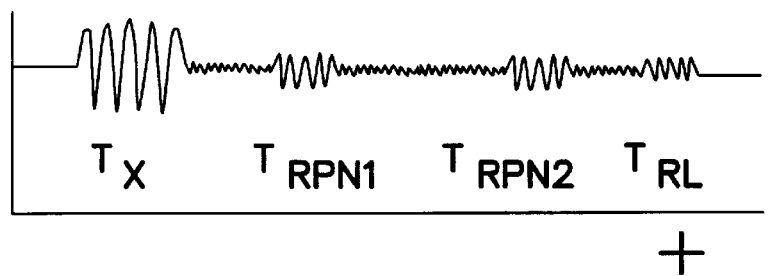
FIG. 8 is a timing diagram illustrating transmit and receive signals useful in explaining how the invention minimizes a form of "pipe noises"
Figure 9A:
FIG. 9A to 9D are examples of other cross sections of the device of the invention.
Figure 9B:
Figure 9C:
Figure 9D:

FIG. 8 is useful in explaining an additional advantage according to the invention. When a transmit pulse Tx is transmitted by a transmit transducer 20, a receive signal $T_{RL}$ which traverses the liquid in the pipeline is received at a receive transducer 20 some time period later. This is the signal that is used to determine transit time. However, the receive transducer also receives certain undesirable sonic noise signals which instead of traversing the liquid, travel through the pipe wall. A first of these "pipe noise" signals is $T_{RPN1}$ which is a signal that travels from the transmit transducer directly through the pipeline wall to the receive transducer. This signal, shown in FIG. 8, can be ignored and thus eliminated because it is generally received well in advance of $T_{RL}$. However, another pipeline wall noise signal $T_{RPN2}$, travels circumferentially helically about a round pipeline wall. This signal may be received close to, or during the time when, the desired signal $T_{RL}$ is received by the receive transducer. This is shown schematically in FIG. 8. In FIG. 8, $T_{RPN2}$ is shown as having been received ahead of $T_{RL}$. However, it may be received at the same time as $T_{RL}$ and be buried within $T_{RL}$. This undesired signal can result in corruption of $T_{RL}$ and improper determination of time of arrival of $T_{RL}$ and thus lead to calculation of incorrect transit time and therefore incorrect fluid flow velocity. It can also lead to a drift in measurement results.

According to the invention, because the member 50 is not round in cross-section, the noise signal $T_{RPN2}$ is substantially eliminated because the propagation of this signal in a helical path is substantially stopped or minimized at the corners of the square or rectangular member 50.

Figure 10:
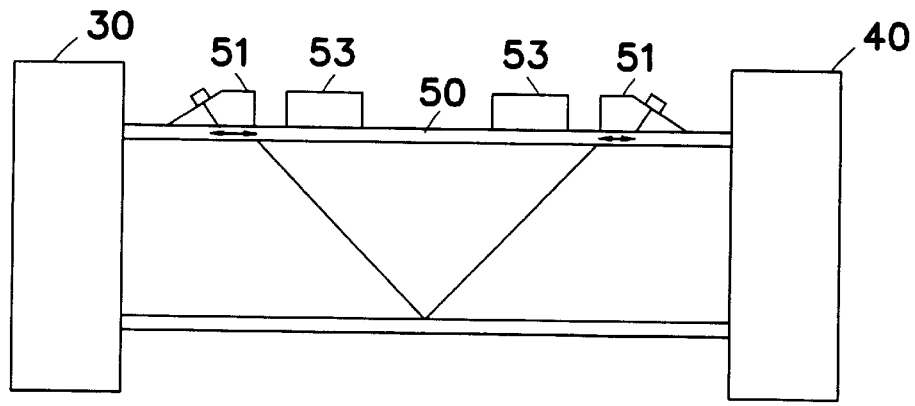
FIG. 10 is a schematic side view of the device of the invention including a structure for attenuating pipe noise.
Figures 11, 11A:
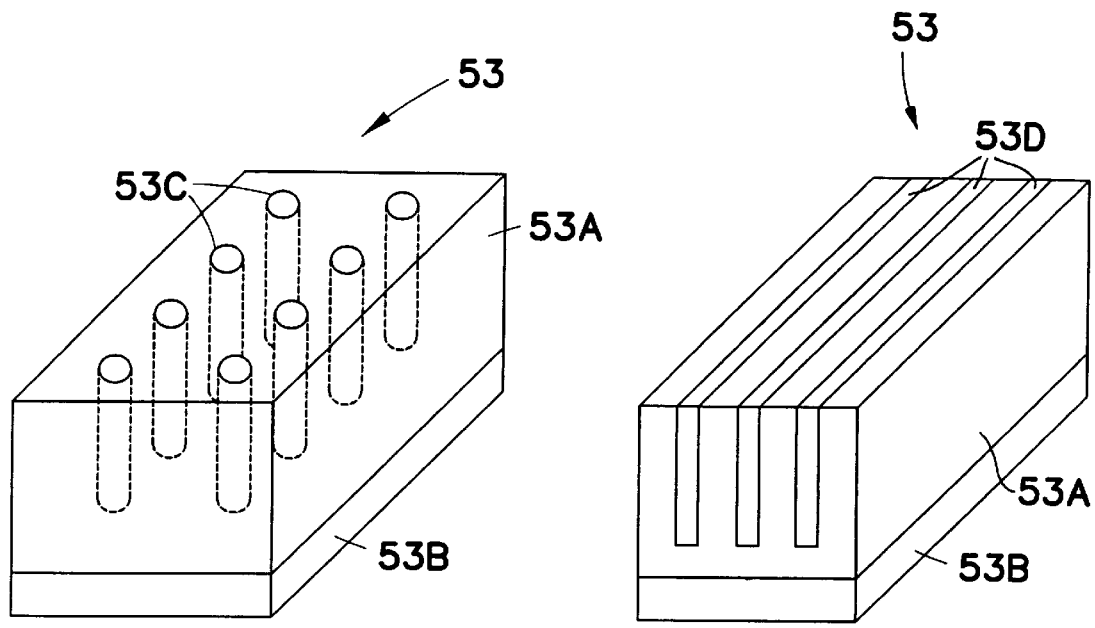
FIG. 11 is a perspective view of the attenuating structure of FIG. 10.
FIG. 11A is a perspective view of an alternative attenuating structure.

FIGS. 10, 11 and 11A shows an additional structure for attenuating the pipe noise signal. An attenuating device 53 is provided attached to the member 50. The attenuating device 53 attenuates any pipe noise signals traveling through the pipe material. FIG. 11 shows an example of the attenuating device 53. As shown, the device comprises a metallic structure 53A which is mounted on a mounting block 53B. The metallic structure 53A and mounting block 53B are preferably a metal similar to the metal of the member 50. They may be a different metal, however, or a different material such as a suitable plastic material. The member 53A may comprise a plurality of holes 53C which are suitably bored or drilled into the member 53A. The holes are filled with a viscous attenuating material, for example, a viscous liquid or semi-liquid such as a glue, tar or an acoustic grease, for example Krytox. The function of the member 53 is to absorb and reflect and thereby attenuate any noise signals transmitted from the member 50 into the member 53. The acoustic attenuating material in the bores 53C thus helps to reduce the amplitude of the noise signal received at the receiving transducer by acting as a sonic labyrinth.

An alternative structure is shown in FIG. 11A. In this structure, a sonic labyrinth is created by a plurality of slots 53D in which is disposed a sound absorbing and/or reflective material. The effect is to create a reflective labyrinth so that sound energy reflected into the space between the slots 53D are reflected off the slots a plurality of times, each tine attenuating the signal.

Preferably, according to the invention, the transducer is a wide-beam transducer of the type described in U.S. Pat. No. 3,987,674. In order to take full advantage of the spool section according to the invention, particularly to minimize second order errors in sonic propagation velocity measurement, it is preferable to use the correlation technique described in co-pending patent application Ser. No. (203-55) entitled "Method and Apparatus For Determining Ultrasonic Pulse Arrival in Fluid Using Phase Correlation".

In addition to the advantages described above, the pipe spool section described has an additional advantage. By having the opportunity to install flow measurement ultrasonic transducers on the clamp-on spool assembly of the invention and subjecting that assembly to actual flow tests in a calibration laboratory, it can be determined what the output calibration factors are at various flow rates for flow measurement systems to be installed in the field. Flow measurement systems manufactured by Controlotron Corp. have a multi point calibration capability. This means that at various flow rates a different calibration factor can be set to account for any non-linearity that may occur in any section of the measuring instrument. A set up file can be created and stored in the flow measurement system based on the measured calibration factors. This setup file can also be loaded onto a storage medium, e.g., a disk, and the disk can be shipped with the machine so that a user can load that data into any flow computer that comes along with the spool section that has the calibration attached to it.

Alternatively, a flow computer can be provided to a customer with that data in it bundled together with a flow tube with the spool section of the invention. In this way, each customer receives a flow meter with a calibration certificate. The calibration remains accurate even for different liquids because the machine will recognize the many liquids by the changing measured sonic propagation velocity. The calibration is Reynolds number related, not velocity related. Thereby, the machine will automatically maintain its calibration even as liquids change and a calibration certification can be delivered with each machine. This is very useful to the user in certain industries where calibration certification is required. This is not possible with a clamp on system which is installed in the field because in the field, calibration is not controllable by the manufacturer. For example, it is not possible to assure that customers enter the correct parameters but in the case of the clamp on spool section or the flow tube, all factors can be controlled and therefore the manufacturer will be able to certify the calibration of a flow measurement system based on the results of using that system with the spool section described.

Each flow measurement system can be calibrated by passing a known volume or mass through the assembly of the invention at known flow rates. The measured flow rates can be compared to the known flow rates and calibration factors for the various flow rates obtained. A calibration certificate can thus be provided for each flow measurement system, which is provided to the customer together with the spool section of the invention.

FIGS. 12–15 show various versions of a preferred embodiment according to the present invention. Although the embodiments previously described illustrate the principle of the invention in flattening the flow profile, it has been discovered that because of the rectangular or square cross section of the spool section according to the invention, it is necessary to strengthen the rectangular or square cross section structure to withstand pressures which may be encountered in typical fluid carrying pipes. In particular, because of the square or rectangular cross-section, the spool section is subject to stresses which are not conventionally encountered in circular cross-section pipes. In the typical round cross-section pipeline, all stresses tend to be tensile stresses. In contrast, in a square or rectangular cross-section member subject to internal pressure of a flowing liquid, the stresses can tend to cause the flat surfaces to bow in shape or otherwise deform. This has a deleterious effect on the accuracy of the determination of the flow measurements because the distances and thus flow paths change depending upon the pressure. A solution to this problem is to make the cross-sections of the flat surfaces thicker but this has the disadvantage of increasing the amount of noise which is transmitted directly through the pipe instead of through the liquid. This causes problems in determining the time of arrival of the received liquid signal because the noise signals are less attenuated in a thicker cross-section member. Furthermore, the thicker cross-section attenuates the ultrasonic signals which are intended to be transmitted into the fluid.

Accordingly, simply making the cross-sectional thickness of the spool section larger does not provide an adequate solution.

According to the invention, the solution to this problem is to provide a cutout or track or plurality of such cutouts or tracks in the flat surface of the spool section into which the transmitting and receiving transducers can be disposed. In particular, multiple tracks are provided into which the plurality of transducers can be disposed.

Figure 12:
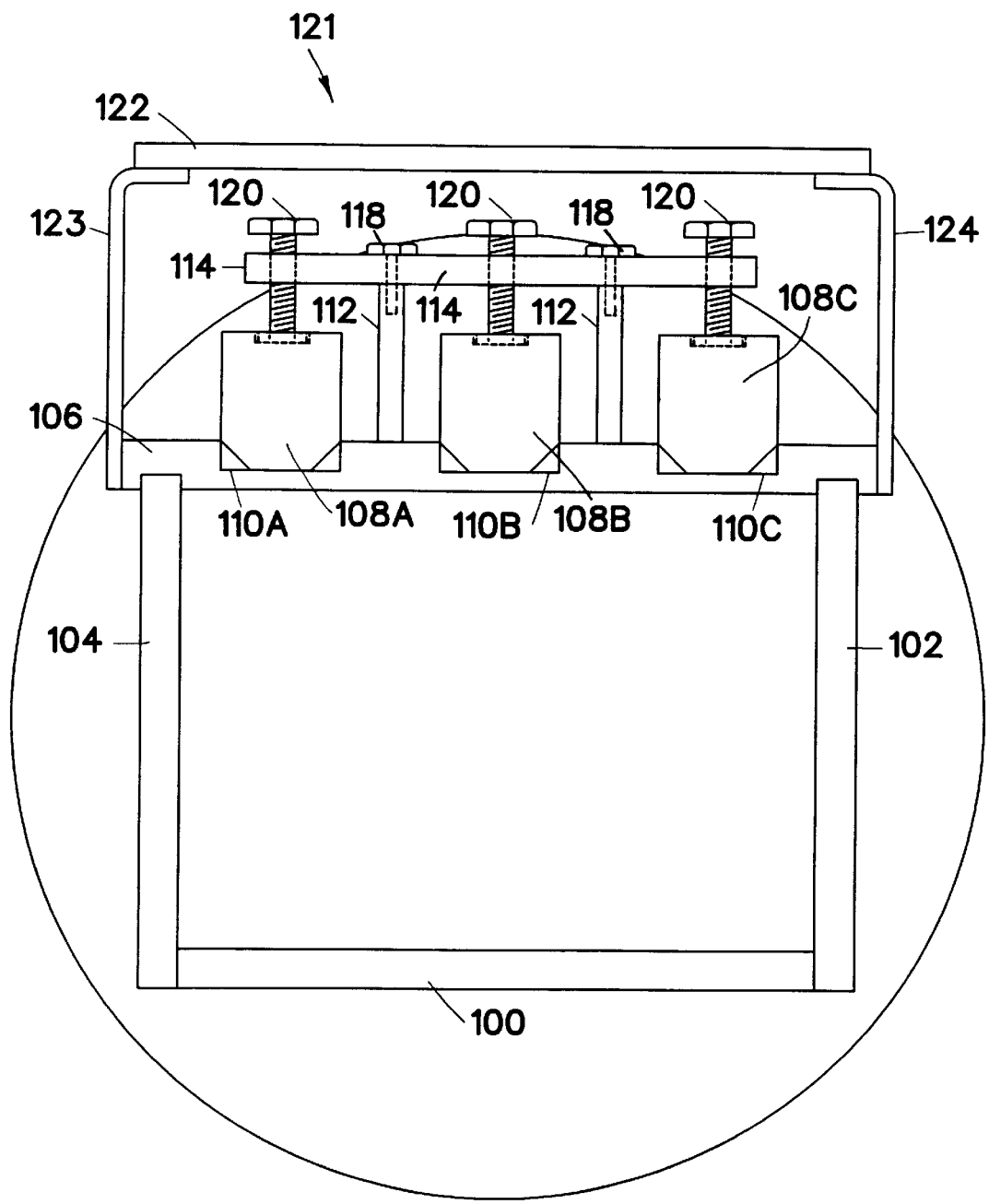
FIG. 12 is a cross sectional view through a preferred embodiment of the invention.
Figure 13:
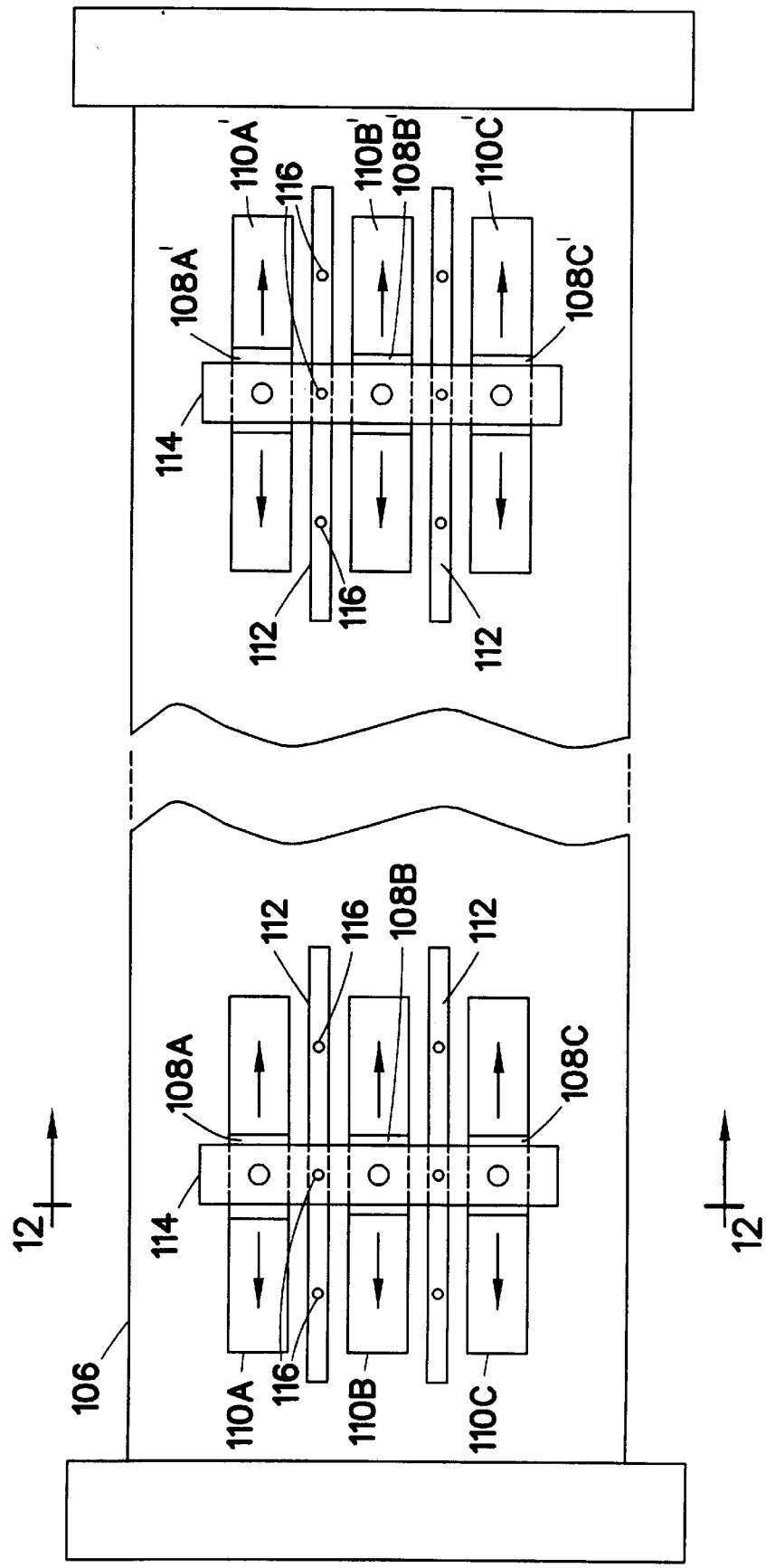
FIG. 13 is a top plan view of the preferred embodiment of FIG. 12.

Turning now to FIGS. 12 and 13, an example of a preferred embodiment of the invention wherein three pairs of ultrasonic transmitting and receiving transducers are used is shown. The invention can be applied to any number of pairs of transducers. With reference to FIGS. 12 and 13, the spool section having a rectangular or square cross-section is comprised of four welded together numbers 100, 102, 104 and 106. The member 106 receives the plurality of transducers 108A, 108B and 108C at one end of the spool section and 108A', 108B' and 108C' at the other end. The member 106 of the spool section is provided with a plurality of tracks, e.g. machined into the surface, one for each transducer 108A, 108B and 108C and 108A', 108B' and 108C'. The tracks are indicated at 110A, 110B, 110C, 110A', 110B' and 110C'. FIG. 12 is taken along sectional lines 12—12 of FIG. 13.

Each transducer 108A, 108B and 108C and the corresponding transducers on the other side, are fitted into their respective tracks and preferably movable along the track in the direction of the arrows shown to one of a plurality of positions which provides best performance. Because the member 106 has been weakened by these tracks 110A, 110B and 110C, and 110A', 110B' 110C' and thus will tend to bow upwardly due to pressure within the spool section as a result of the localized weaknesses caused by these tracks, a structure is provided above the member 106 to prevent deformation of the member 106. This structure comprises at least one normally extending number 112 which is attached to the member 106, preferably by welding. The members 100, 102, 104 and 106 are also preferably attached together by a suitable welding technique. The normally extending members 112 are fastened to a member 114 which is generally parallel with the member 106 and can be fastened to each of the members 112 by suitable methods, for example, welding or as shown, by bolts. As shown in FIG. 13, the member 112 can include a plurality of fastening holes 116, which are provided to enable fastening of the member 114 via bolts 118 to the member 112 at the appropriate location as determined by the disposition of the transducers 108A, 108B and 108C and similarly for the other side of the spool section. Each transducer 108A, 108B and 108C and the transducers on the other side of the spool section are maintained, fixed in position, by a suitable fastening device, for example, a clamping bolt 120 which can be tightened down against a protected surface of the respective transducer to maintain it in position.

The effect of the structure of the present invention is to prevent the member 106 from deforming or bowing. In effect, the members 112 and 114 provide an I-beam type structure which prevents deformation of the member 106 due to internal pressure in the spool section. As shown in FIG. 13, the members 112 need only extend alongside the tracks 110A, 110B and 110C and similarly on the other side of the spool section. The member 114 can cover a localized area above the transducers. Alternatively, it can be made wider than shown, so that it covers substantially the entire length of the normally extending members 112.

Figure 14:
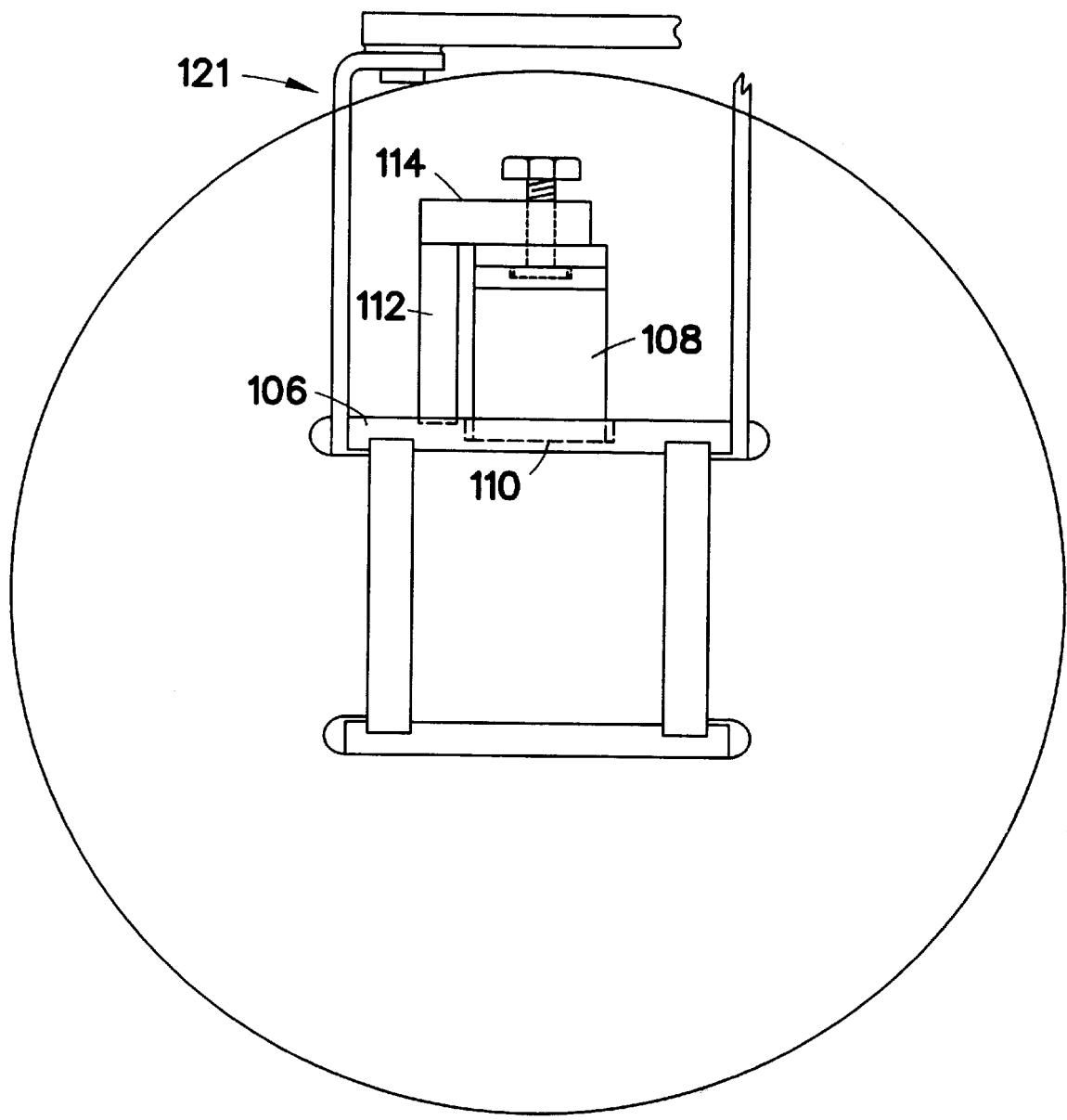
FIG. 14 is a cross section through a variation of the preferred embodiment according to the present invention.

FIG. 14 shows an embodiment of the invention for a single pair of transducers. As shown, the member 112 extends alongside a track 110 in which a transducer 108 is disposed. A member 114 is fastened to the member 112 to provide suitable strength to the member 106.

Figure 15:
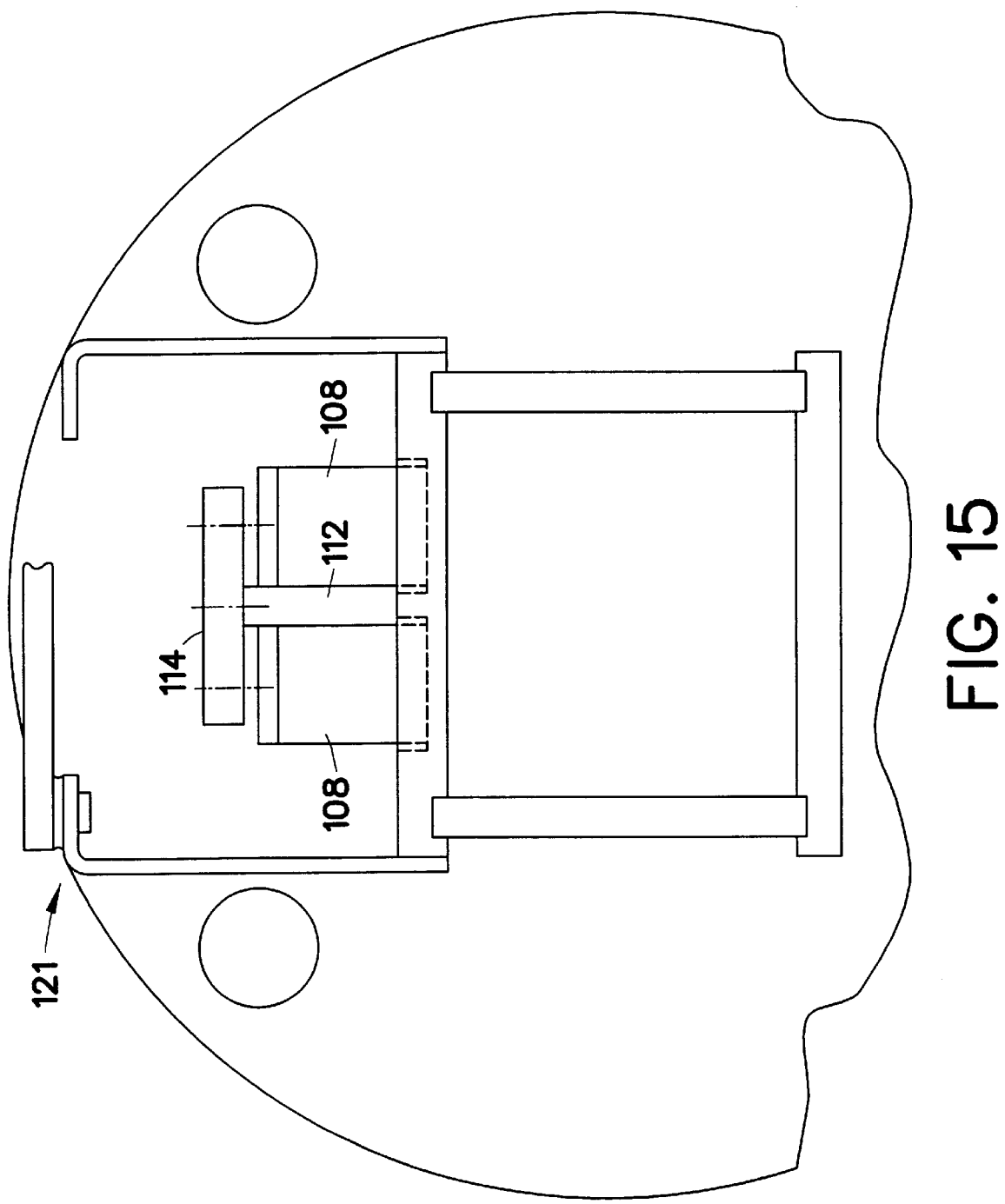
FIG. 15 is a cross section through another variation of the preferred embodiment according to the present invention.

FIG. 15 shows another embodiment of the invention using two transducers 108. A single member 112 is disposed between the transducers 108 and fastened to a parallel member 114. As shown in each of FIGS. 12, 14 and 15, a suitable housing 121 comprising members 122, 123 and 124 may be provided to cover the transducers and the support structure for the member 106.

Figure 16:
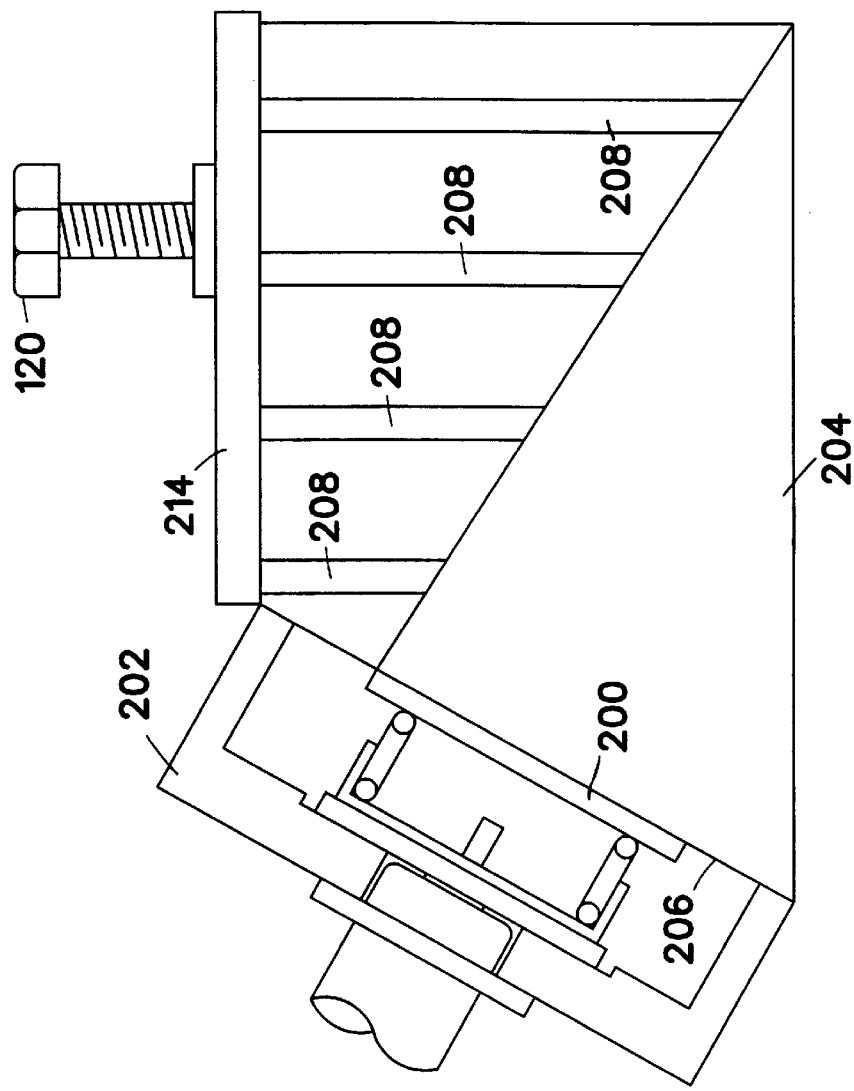
FIG. 16 is a side plan view of a transducer according to the present invention showing a labyrinth structure which is useful in damping and attenuating internal reflections of ultrasonic signals generated by the crystal of the transducer.
Figure 2E:
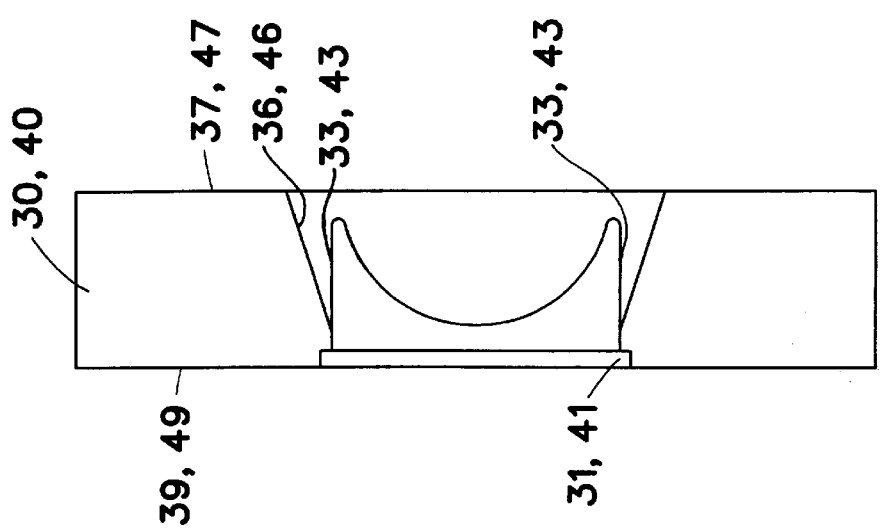
FIG. 2E is a side cross sectional view of a flange of the device of the invention.
Figure 4:
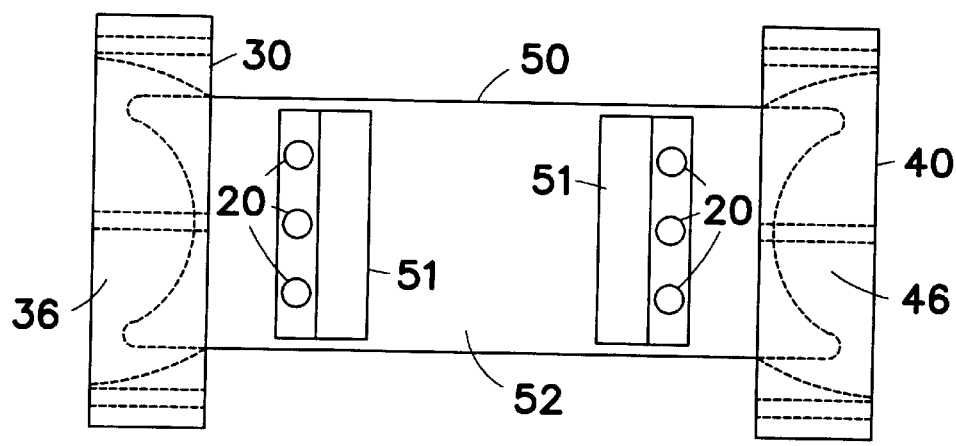
FIG. 4 is a top plan view of a typical device of FIG. 1.

FIGS. 16 and 17 show an embodiment of the transducer according to the present invention which is provided to reduce and absorb internal reflections of longitudinal and mode converted shear ultrasonic signals generated by the transducer crystal 200 which is disposed in a crystal housing 202. The crystal 200 is provided on a transducer block 204. The transducer block 204 has an inclined surface 206 on which the crystal 200 is mounted. The surface is disposed at an appropriate angle to allow transmission of ultrasonic signals into a pipe wall at the appropriate angle (typically about 590 for a longitudinal sonic propagation velocity of 95000 in/sec.) on which the transducer is disposed. Along the top surface of the transducer block 204, a plurality of slots 208 are provided. See FIG. 17. In these slots, a viscous and ultrasonic energy reflective/absorptive material, such as tar, glue or plastic material, which is suitably sound absorbing and/or sound reflective is disposed. As shown in FIG. 17, which is a perspective view of an embodiment of the transducer according to FIG. 16, both the reflections of the transduce block/pipe wall interface of longitudinal mode signals and shear mode converted ultrasonic signals are channeled as illustratively shown by the arrows 210 (longitudinal mode reflection) and 212 (shear mode reflection) into the labyrinth created by the slots 208. As shown, the signals are reflected by the sound absorbing/reflective material contained in the slots 108 generate a multiple number of reflections, with increased attenuation occurring at each reflection. Any signal which escapes the labyrinth is substantially attenuated so that the signal will have minimal effect when it reenters the pipe. Accordingly, the noise signals caused by the reflected ultrasonic signals will have little effect on the signal received by the receiving transducer.

FIG. 18 shows an alternative embodiment wherein the slots 208A do not run from lateral side to lateral side of the transducer block 204. This is a preferable arrangement because the viscous material, especially if it is a flowable viscous material, is prevented from escaping from the slots 208A at the sides. However, the slots 208A require more expensive machining processing than slots 208 of FIGS. 16 and 17 which run from side to side. In the arrangement of FIGS. 16 and 17, where the slots run from side to side, if the viscous material in the slots 208 is flowable, it is necessary to provide a suitable lateral wall to close off the slots 208 at the sides. In either embodiment, a suitable cover member 214 may be provided against which the clamping bolt 120 can be secured.

According to the invention, as shown in FIGS. 12–15, it is preferable to provide a multiple number of transducer pairs. Because of the accuracy provided by the support structure for the member 106, each transducer pair transmit an ultrasonic signal over a path length which is exactly the same. Accordingly, it is only necessary to connect the transducers electrically in parallel. In this way, because each transducer illuminates the flow in a cross section defined by the exact same chord, common chordal summation can be used instead of the more complex Gaussian chordal summation which is necessary when the path lengths are unequal and the chord sizes are different, for example, as is the case in a round pipe.

According to the invention, it is also preferable to put the transducer pairs con the same side of the pipe thereby utilizing the reflection from the other side of the pipe. The reason for this is that the number of paths is effectively twice the number of transducer pairs, i.e., each path includes a reflection back. In this way, the system inherently corrects for non-linearities of the flow path.

According to the invention, a plurality of spool sections for different size pipes can be developed, for example, for pipe sizes from 2 inches to 24 inches in diameter. Different spool sections having a different length and suitable for each of the various pipe diameters within this range can be developed. The larger the diameter of the pipe, generally the greater the number of transducers required. For example, for a two inch pipe having an outside diameter of 2.375 inches, a single transducer pair is suitable. For larger pipes, for example, an 8 inch pipe having an outside diameter of 8.625 inches, three transducer pairs may be necessary. For even larger pipes, for example, a 24 inch pipe, 5 transducers may be necessary. In each case it is possible to satisfy both the sonic requirements by placing the transducers in recessed tracks in the flat surface of the spool section and at the same time satisfy the needed pressure handling requirements by providing a suitable structure comprising the normal extending members 112 and the parallel beam members 114, as necessary, depending on the number of transducers.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Apparatus for insertion into a pipe adapted for mounting an ultrasonic flow measurement transducer, the apparatus comprising:

two connectors adapted to connect into a pipe; and a center section coupled between the two connectors, the two connectors having central openings therein for fluid flowing through the pipe, the center section being hollow for the flow of fluid from the pipe therethrough and communicating with the pipe through the openings in the connectors, the center section having a transverse cross-section having at least two substantially flat opposed portions;

the center section having an outer substantially flat surface adapted for mounting of at least one pair of ultrasonic transmitting and receiving flow measurement transducers thereon; the transducers adapted to transmit ultrasonic signals for reflection by at least one of said opposed portions;

the two substantially flat opposed portions being substantially parallel to each other and defining a reflection region, the ultrasonic signals being reflected by said at least one opposed portion for receipt by a receiving one of the transducers only in the reflection region.

2. The apparatus of claim 1, wherein the transverse cross section of the center section is substantially square or rectangular.

3. The apparatus of claim 1, further comprising a transition region at each end of the center section whereby the central openings in the two connectors transition in shape from a round cross-section of the pipe to the cross-section of the center section.

4. The apparatus of claim 3, wherein each connector central opening has a conical shape transitioning from the round cross section of the pipe to the cross-section of the center section, with the base of the conical shape being adjacent to the round cross-section of the pipe.

5. Apparatus for insertion into a pipe adapted for mounting an ultrasonic flow measurement transducer, the apparatus comprising:

two connectors adapted to connect into a pipe; and a center section coupled between the two connectors, the two connectors having central openings therein for fluid flowing through the pipe, the center section being hollow for the flow of fluid from the pipe therethrough and communicating with the pipe through the openings in the connectors, the center section having a transverse cross-section having at least two substantially flat opposed portions;

the center section having an outer substantially flat surface adapted for mounting of at least one pair of ultrasonic transmitting and receiving flow measurement transducers thereon; further comprising a transition region at each end of the center section whereby the central openings in the two connectors transition in shape from a round cross-section of the pipe to the cross-section of the center section;

wherein the center section has a smaller cross-sectional area than the central opening of the connector adjacent the pipe.

6. Apparatus for insertion into a pipe adapted for mounting an ultrasonic flow measurement transducer, the apparatus comprising:

two connectors adapted to connect into a pipe; and a center section coupled between the two connectors, the two connectors having central openings therein for fluid flowing through the pipe, the center section being hollow for the flow of fluid from the pipe therethrough and communicating with the pipe through the openings in the connectors, the center section having a transverse cross-section having at least two substantially flat opposed portions;

the center section having an outer substantially flat surface adapted for mounting of at least one pair of ultrasonic transmitting and receiving flow measurement transducers thereon; further comprising a transition region at each end of the center section whereby the central openings in the two connectors transition in shape from a round cross-section of the pipe to the cross-section of the center section;

wherein the transition from round cross-section to the cross-section of the center section assists in reducing fluid pressure drop between the pipe and the center section.

7. The apparatus of claim 1, wherein the center section allows the at least one pair of ultrasonic transmitting and receiving transducers mounted thereon to substantially fully illuminate fluid flowing in the center section with sonic energy.

8. The apparatus of claim 7, wherein a plurality of pairs of ultrasonic transmitting and receiving transducers are adapted to be mounted on the center section for fully illuminating the fluid flow in the center section with a plurality of parallel beams of sonic energy.

9. Apparatus for insertion into a pipe adapted for mounting an ultrasonic flow measurement transducer, the apparatus comprising:

two connectors adapted to connect into a pipe; and a center section coupled between the two connectors, the two connectors having central openings therein for fluid flowing through the pipe, the center section being hollow for the flow of fluid from the pipe therethrough and communicating with the pipe through the openings in the connectors, the center section having a transverse cross-section having at least two substantially flat opposed portions;

the center section having an outer substantially flat surface adapted for mounting of at least one pair of ultrasonic transmitting and receiving flow measurement transducers thereon;

wherein the center section has the effect of making the flow profile of the fluid passing through the pipe substantially uniform between the two substantially flat opposed portions.

10. The apparatus of claim 9, wherein the center section has the effect of minimizing the need to apply Gaussian quadrature chordal summation to determine flow rate of fluid within the pipe.

11. The apparatus of claim 1, further comprising a flow profile flattening device provided in said apparatus for further making the flow profile substantially uniform.

12. The apparatus of claim 1, wherein the center section substantially eliminates a signal that would be transmitted from a transmitting transducer to a receiving transducer circumferentially in a helical path through the pipe wall of a round pipe.

13. The apparatus of claim 12, wherein square corners of the center section substantially eliminate receipt at the receiving transducer of the helically transmitted signal that would be transmitted in the pipe wall of a round pipe.

14. The apparatus of claim 1, wherein the connectors each comprise a flange for coupling into the pipe.

15. The apparatus of claim 1, wherein the connectors comprise weldments adapted to be welded into a pipe.

16. The apparatus of claim 1, further comprising a recessed slot in the flat surface of the center section for receiving each transducer.

17. Apparatus for insertion into a pipe adapted for mounting an ultrasonic flow measurement transducer, the apparatus comprising:

two connectors adapted to connect into a pipe; and a center section coupled between the two connectors, the two connectors having central openings therein for fluid flowing through the pipe, the center section being hollow for the flow of fluid from the pipe therethrough and communicating with the pipe through the openings in the connectors, the center section having a transverse cross-section having at least two substantially flat opposed portions;

the center section having an outer substantially flat surface adapted for mounting of at least one pair of ultrasonic transmitting and receiving flow measurement transducers thereon;

further comprising a recessed slot in the flat surface of the center section for receiving each transducer; and further comprising a member extending normally from the flat surface of the center section adjacent and parallel to the slot for strengthening the flat surface against pressure from a fluid flowing in the center section.

18. The apparatus of claim 17, further comprising a member substantially parallel to the flat surface coupled to the normally extending member for further strengthening the flat surface against deformation due to pressure of a fluid flowing in the center section.

19. The apparatus of claim 18, wherein the normally extending member has a plurality of fastening locations for fastening the parallel member in one of a plurality of locations corresponding to the location in the slot in which the transducer is disposed.

20. The apparatus of claim 18, further comprising a plurality of slots each for a respective transducer of a transducer pair arranged alongside each other, a normally extending member arranged between adjacent slots, a parallel member being arranged above the normally extending members connecting the normally extending members together.

21. The apparatus of claim 18, further comprising a clamp securing the transducer to the flat surface.

22. The apparatus of claim 21, wherein the clamp comprises a clamp member extending between the parallel member and a surface of the transducer.

23. The apparatus of claim 22, wherein the clamp member comprises a bolt threadable through a threaded hole in the parallel member and having an end engaging against the surface of the transducer.

24. A method for determining the volumetric flow rate of fluid within a pipe comprising the steps of:

coupling a member into the pipe having a hollow section for the flow of fluid from the pipe therethrough and communicating with the pipe, the hollow section having a transverse cross-section having at least two substantially flat opposed portions;

mounting at least one pair of ultrasonic transmitting and receiving flow measurement transducers on an outer substantially flat surface of said hollow section;

illuminating the fluid flowing in the hollow section with sonic energy from said pair of transmitting and receiving transducers, the transducers adapted to transmit ultrasonic signals for reflection by at least one of said opposed portions;

the two substantially flat opposed portions being substantially parallel to each other and defining a reflection region, the ultrasonic signals being reflected by said at least one opposed portion for receipt by a receiving one of the transducers only in the reflection region; and calculating the volumetric flow rate based on data from polling said at least one transmitting transducer and receiving transducer.

25. The method of claim 24, wherein the transverse cross section of the center section is substantially square or rectangular.

26. The method of claim 24, wherein the hollow section allows the at least one pair of ultrasonic transmitting and receiving transducers mounted thereon to substantially fully illuminate fluid flowing in the hollow section with sonic energy.

27. The method of claim 26, further comprising mounting a plurality of pairs of ultrasonic transmitting and receiving transducers on the hollow section for fully illuminating the fluid flow in the hollow section with a plurality of parallel beams of sonic energy.

28. The method of claim 24, further comprising disposing a flow profile flattening device in said hollow section for further making the flow profile substantially uniform.

29. The method of claim 24, further comprising providing connectors on both ends of said hollow section to couple the hollow section into the pipe.

30. The method of claim 29, further comprising transitioning central openings in each of the two connectors from a round cross-section of the pipe to the cross-section of the center section.

31. The method of claim 29, further comprising the step of providing said connectors on both ends of the hollow section as flanges to couple the hollow section into the pipe.

32. The method of claim 29, further comprising the step of providing said connectors as weldments adapted to be welded into said pipe.

33. A method for determining the volumetric flow rate of fluid within a pipe comprising the steps of:

coupling a member into the pipe having a hollow section for the flow of fluid from the pipe therethrough and communicating with the pipe, the hollow section having a transverse cross-section having at least two substantially flat opposed portions;

mounting at least one pair of ultrasonic transmitting and receiving flow measurement transducers on an outer substantially flat surface of said hollow section;

illuminating the fluid flowing in the hollow section with sonic energy from said pair of transmitting and receiving transducers;

calculating the volumetric flow rate based on data from polling said at least one transmitting transducer and receiving transducer;

further comprising transitioning central openings in each of the two connectors from a round cross-section of the pipe to the cross-section of the center section; and wherein the step of transitioning comprises substantially conically transitioning such that the base of the conical transition is disposed adjacent the pipe.

34. The method of claim 30, wherein the center section has a smaller cross-sectional area than the central opening of the connector adjacent the pipe.

35. The method of claim 30, wherein the transition from the cross-section of the center section to the cross section of the pipe assists in reducing fluid pressure drop from the pipe to the hollow section.

36. The method of claim 24, wherein the center section substantially eliminates a signal that would be transmitted from a transmit transducer to a receive transducer circumferentially in a helical path through the pipe wall of a round pipe.

37. The method of claim 36, wherein square corners of the center section substantially eliminate receipt at the receive transducer of the helically transmitted signal that would be transmitted in the pipe wall of a round pipe.

38. The method of claim 28, wherein the center section has the effect of minimizing the need to apply Gaussian quadrature chordal summation to determine flow rate of fluid within the pipe.

39. The method of claim 24, further comprising using said member coupled into a pipe and having a known volumetric flow rate to calibrate a flow measurement system.

40. The method of claim 24, further comprising providing a recessed slot in the flat surface of the hollow section for receiving a transducer.

41. The method of claim 40, further comprising providing a member extending normally from the flat surface of the hollow section adjacent and parallel to the slot for strengthening the flat surface against pressure from a fluid flowing in the hollow section.

42. The method of claim 41, further comprising providing a member substantially parallel to the flat surface coupled to the normally extending member for further strengthening the flat surface against deformation due to pressure of a fluid flowing in the hollow section.

43. The method of claim 42, further comprising providing the normally extending member with a plurality of fastening locations for fastening the parallel member in one of a plurality of locations corresponding to the location in the slot in which the transducer is disposed.

44. The method of claim 42, further comprising providing a plurality of slots each for a respective transducer of a transducer pair arranged alongside each other, arranging a normally extending member between adjacent slots, and arranging a parallel member above the normally extending members connecting the normally extending members together.

45. The method of claim 42, further comprising securing the transducer to the flat surface.

46. The method of claim 45, wherein the step of securing comprises providing a clamp member extending between the parallel member and a surface of the transducer.

47. The method of claim 46, wherein the step of providing a clamp member comprises providing a bolt threadable through a threaded hole in the parallel member and having an end engaging against the surface of the transducer.

48. A method for making the flow profile of fluid flowing within a pipe substantially uniform from one side of the pipe to an opposite side comprising the step of:

coupling a member into the pipe having a hollow section for the flow of fluid from the pipe therethrough and communicating with the pipe, the hollow section having a transverse cross-section having at least two substantially flat opposed portions.

49. The method of claim 48, wherein the hollow section has a substantially square or rectangular cross-section.

50. The method of claim 48, further comprising mounting at least one pair of ultrasonic transmitting and receiving flow measurement transducers on an outer substantially flat surface of said hollow section.

51. The method of claim 50, further comprising illuminating the fluid flowing in the hollow section with sonic energy with said at least one pair of transmitting and receiving transducers and calculating the volumetric flow rate based on data from polling said at least one pair of transmitting and receiving transducers.

52. The method of claim 50, wherein the hollow section allows the at least one pair of ultrasonic transmitting and receiving transducers mounted thereon to substantially fully illuminate fluid flowing in the hollow section with sonic energy.

53. The method of claim 50, further comprising mounting a plurality of pairs of ultrasonic transmitting and receiving transducers on the hollow section for fully illuminating the fluid flow in the hollow section with a plurality of parallel beams of sonic energy.

54. The method of claim 48, further comprising disposing a flow profile flattening device in said hollow section for further making the flow profile substantially uniform.

55. The method of claim 54, wherein the step of further making the flow profile substantially uniform comprises disposing a swirl generator in the hollow section.

56. The method of claim 49, wherein the hollow section has a smaller cross-sectional area than the central opening of the flange adjacent the pipe.

57. The method of claim 49, wherein the transition from round cross-section to the cross section of the hollow section assists in reducing fluid pressure drop between the pipe and the hollow section.

58. The method of claim 49, wherein the hollow section substantially eliminates a pipe noise signal that would be transmitted from a transmit transducer to a receive transducer circumferentially in a helical path through the pipe wall of a round pipe.

59. The method of claim 49, wherein square corners of the hollow section substantially eliminate receipt at the receive transducer of the pipe noise signal that would be transmitted in the pipe wall of a round pipe.

60. The method of claim 49, wherein the hollow section has a substantially square or rectangular cross section.

61. A method for minimizing unwanted signals traveling through a pipe wall in an ultrasonic flow measurement device comprising the step of:

coupling a member into the pipe having a hollow section for the flow of fluid from the pipe therethrough and communicating with the pipe, the hollow section having a transverse cross-section having at least two substantially flat opposed surfaces and having substantially square corners;

wherein the square corners substantially eliminate transmission of pipe signals that would be transmitted from a transmit transducer circumferentially in a helical path through the pipe wall of a round pipe to the receive transducer.

62. Apparatus for insertion into a pipe adapted for mounting an ultrasonic flow measurement transducer, the apparatus comprising:

two connectors adapted to connect into a pipe; and a center section coupled between the two connectors, the two connectors having central openings therein for fluid flowing through the pipe, the center section being hollow for the flow of fluid from the pipe therethrough and communicating with the pipe through the openings in the connectors, the center section having a transverse cross-section having at least two substantially flat opposed portions;

the center section having an outer substantially flat surface adapted for mounting of at least one pair of ultrasonic transmitting and receiving flow measurement transducers thereon;

wherein the transducers are wide beam path ultrasonic transducers.

63. A method for determining the volumetric flow rate of fluid within a pipe comprising the steps of:

coupling a member into the pipe having a hollow section for the flow of fluid from the pipe therethrough and communicating with the pipe, the hollow section having a transverse cross-section having at least two substantially flat opposed portions;

mounting at least one pair of ultrasonic transmitting and receiving flow measurement transducers on an outer substantially flat surface of said hollow section;

illuminating the fluid flowing in the hollow section with sonic energy from said pair of transmitting and receiving transducers;

calculating the volumetric flow rate based on data from polling said at least one transmitting transducer and receiving transducer;

wherein the transducers are wide beam path ultrasonic transducers.

64. A method for making the flow profile of fluid flowing within a pipe substantially uniform from one side of the pipe to an opposite side, the method comprising the steps of:

coupling a member into the pipe having a hollow section for the flow of fluid from the pipe therethrough and communicating with the pipe, the hollow section having a transverse cross-section having at least two substantially flat opposed portions;

providing the hollow section with at least one pair of ultrasonic transmitting and receiving flow measurement transducers on an outer substantially flat surface of the hollow section; and wherein the transducers are wide beam path ultrasonic transducers.

65. A method of calibrating a fluid flow measurement system having ultrasonic flow measurement transducers comprising:

installing a spool section in a pipe conveying a known quantity of liquid in a time period and producing a known volumetric flow rate;

the spool section having at least one pair of ultrasonic flow measurement transmitting and receiving transducers thereon, the spool section having two opposed substantially flat surfaces, at least one of the surfaces for mounting the transducers thereon and at least one of the surfaces for providing a sonic reflective surface;

illuminating the fluid flowing in the hollow section with sonic energy from said pair of transmitting and receiving transducers; the transducers adapted to transmit ultrasonic signals for reflection by at least one of said opposed substantially flat surfaces;

the two opposed substantially flat surfaces being substantially parallel to each other and defining a reflection region, the ultrasonic signals being reflected by said at least one opposed substantially flat surface for receipt by a receiving one of the transducers only in the reflection region;

polling the transducers with the flow measurement system to determine the volumetric flow rate;

comparing the determined volumetric flow rate with the known volumetric flow rate; and determining a calibration factor for the flow measurement system based on the comparison of the determined flow rate with the known flow rate.

66. The method of claim 65, further comprising performing the steps of producing a known volumetric flow rate, polling the transducers, comparing and determining for a plurality of known flow rates, thereby to obtain a plurality of calibration factors for the flow measurement system.

67. The method of claim 66, further comprising issuing a calibration certificate for the flow measurement system.

68. An ultrasonic transducer housing for attenuating ultrasonic signals generated by a crystal contained in the housing and which ultrasonic signals are undesired reflections off an interface between the housing and a material into which desired ultrasonic signals from the crystal are to be transmitted, the housing comprising:

a transducer block in which the crystal is mounted at a prescribed angle to enable transmission of the desired signals into the material; and the transducer block including a plurality of apertures containing an ultrasonic energy reflective and/or absorbent material.

69. The housing of claim 68, wherein the apertures comprise a plurality of slots having an extent substantially perpendicular to an interface between the transducer block and the material into which the desired signals are transmitted.

70. The housing of claim 68, wherein the apertures have a depth in the block incrementally increasing in a direction away from the crystal.

71. The housing of claim 69, wherein the slots extend from a lateral side of the block to an opposed lateral side of the block.

72. The housing of claim 69, wherein the slots are not coextensive with the lateral width of the block.

73. The housing of claim 68, wherein the apertures create a sonic labyrinth for sonic energy in the housing, generating multiple reflections of said undesired sonic signals, thereby attenuating said undesired signals.

* * * * *